Jan. 16, 1962 M. OLLODORT 3,017,141
CENTER OF GRAVITY CONTROLLER
Filed Nov. 2, 1956 2 Sheets-Sheet 1

INVENTOR.
MORRIS OLLODORT
BY
Thomas S. MacDonald
ATTORNEY

United States Patent Office 3,017,141
Patented Jan. 16, 1962

3,017,141
CENTER OF GRAVITY CONTROLLER
Morris Ollodort, Whittier, Calif., assignor to North American Aviation, Inc.
Filed Nov. 2, 1956, Ser. No. 620,010
9 Claims. (Cl. 244—76)

The present invention is directed to a vehicle center of gravity controller. More particularly, this invention concerns a center of gravity control for an airborne vehicle in which changes in center of gravity are sensed and flow of liquid is controlled from forward and aft tanks in the vehicle.

A particular problem has existed with respect to the aerodynamic flight characteristics of aircraft and missiles due to changes in the center of gravity of the aircraft or missile as fuel is expended during flight. Heretofore various schemes have been proposed to minimize the effect of the resultant imbalance in such vehicles. Specifically, in lighter-than-air ships and in aircraft pilot control of various ballast tanks and fuel tanks has been accomplished to keep the vehicle in trim. These devices have been termed "stabilizers" in the art. The presently proposed device provides an automatic detector of changes in center of gravity and automatically provides for shifting of a liquid or fuel from containers or tanks forward and aft of the center of gravity to maintain the original or desired center of gravity location. This control is had by providing a flow regulating valve in a conduit between forward and aft tanks with a means for positioning the setting of the valve, means for sensing changes in the center of gravity, having an output to control and servo a liquid flow from one tank to another.

An object of this invention is to provide a center of gravity controller for a vehicle.

A further object of this invention is to provide a center of gravity controller for a vehicle entailing automatically shifting fuel from one tank to another in such vehicle.

A still further object of this invention is to provide a center of gravity control for aircraft and missiles which operates automatically from electrical signals indicating changes in the center of gravity of the vehicle.

An additional object of this invention is to provide a center of gravity controller in combination with an airborne vehicle control means such as a trimmer control surface or autopilot output.

An additional object of this invention is to provide a center of gravity control incorporating accelerometers sensing changes in vehicle center of gravity.

The above objects as well as other objects of this invention will be apparent from the following description and drawings in which FIG. 1 shows a center of gravity control based on the angular position of a vehicle horizontal control surface as an indication of change in center of gravity;

Figure 1:
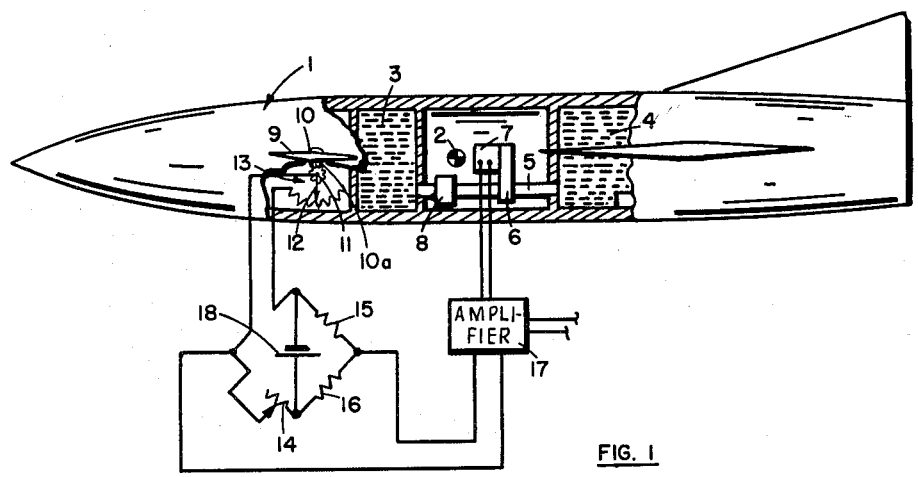

The center of gravity controller of this invention is shown in detail in FIG. 1. The center of gravity 2 of the vehicle such as a missile 1 is situated between at least two liquid-containing tanks 3 and 4, forward and aft of the center of gravity point. A conduit means 5 allows communication of the fluid from one tank to the other. A flow regulating valve 6 is provided within the conduit to control either or both the direction and amount of flow from one tank to another. A positioning means 7 controls the position of the flow regulating valve, in response to electrical signals received from the hereinafter described sensor means. Ordinarily a check valve 8 may be provided in the conduit means to forestall flow of fluid in any one direction if it be so desired. A horizontal control surface such as a trimmer 9 is provided externally of the vehicle. This trimmer is positioned by the rotation of a trimmer shaft 10 or by any equivalent means as commonly used in airframe design. As illustrated, a gear 11 is enmeshed with gear 10a keyed to shaft 10 and has attached thereto a wiper 12 in sliding engagement with a potentiometer coil to provide an electrical signal output from the potentiometer shown generally as 13 proportional to trimmer position. It is necessary to control the center of gravity since the trimmer will take a position dependent upon that center of gravity. If the center of gravity varies any great amount from the center of gravity designed into the vehicle, the angular position assumed by trimmer 9 causes an increase in aerodynamic drag of the vehicle; also stability and control may be jeopardized. In order to maintain performance requirements in aircraft and missiles it is of utmost importance to minimize trim drag. The signal from the potentiometer 13 is fed into one arm of a Wheatstone bridge. An opposite arm of the bridge contains a second potentiometer 14 which is adjusted to a position which results in a balance of the bridge when the control surface is in the correct position corresponding to the desired center of gravity location. If the center of gravity is located in other than the desired position an indication of this relocation is provided by a corresponding angular repositioning of the control surface 9. This results in an unbalance being introduced into the Wheatstone bridge circuit which in turn causes the regulating valve 6 to either open or close depending upon whether more or less fuel than that required for equilibrium is necessary. The Wheatstone bridge further comprises resistors 15 and 16 and a power source 18 as conventionally known. The unbalance output signal from the bridge is amplified in amplifier 17 and fed into a valve-controlling motor 7. If the actual center of gravity position is forward of that desired, the forward trim surface will rotate into a trim position. This position is caused by an excess of liquid or fuel in the forward tank. The regulating valve 6 will then open further to permit more fuel to flow into the aft tank 4 which in turn will shift the center of gravity back to the desired position. The reverse is true when the actual center of gravity position is aft of that desired. Flow of fuel from one tank to another may be by gravity flow or may be aided or accomplished by pumps or other pressurizing means associated with the tanks.

Figure 2:
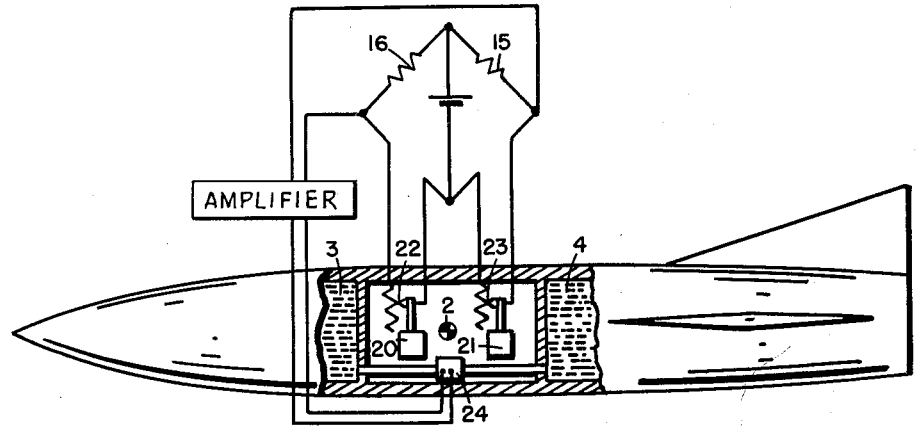
FIG. 2 is a modified form of center of gravity controller incorporating a pair of accelerometers.

FIG. 2 shows a modified form of center of gravity control entailing the use of a pair of accelerometers 20 and 21 positioned on opposite sides, forward and aft of the center of gravity point 2. These accelerometers are employed as sensing elements to measure the position of the center of gravity and are located on the airframe major axis equidistance from the desired center of gravity location. The accelerometer forces are converted into corresponding variable resistances which form two legs 22 and 23 of a Wheatstone bridge with resistances 15 and 16. For linear accelerations of the airframe (axial and normal) the accelerometers have no effect since the differential acceleration is zero. The present accelerometers utilize the relationship between the force due to acceleration at a point to the distance between the point and the center of gravity of a rotating mass. The rotation of the airframe results from the pitching oscillations ordinarily required for control purposes. When the center of gravity is located midway between the accelerometers the differential acceleration is zero. When the center of gravity moves forward or aft of the desired position a difference in acceleration is applied to the Wheatstone bridge and creates an unbalanced electrical output. This output is delivered to the electrical control of a regulating valve 24 to vary the fuel flow from one tank to another which will shift the center of gravity back to the desired position. The particular signal from the bridge circuit may simultaneously actuate pumps or the like in the tanks if they be necessary. In this manner a corrective action is continuously occurring to maintain the center of gravity in a constant position. Various types of accelerometers may be used to provide the electrical signals necessary to be fed into the bridge circuit. Any accelerometer having a restrained mass with associated electrical pickoffs may be employed. For example, the U.S. Patent to Nosker, No. 2,338,732 shows an accelerometer which may be employed, one in each position on either side of the desired center of gravity.

Figure 3:
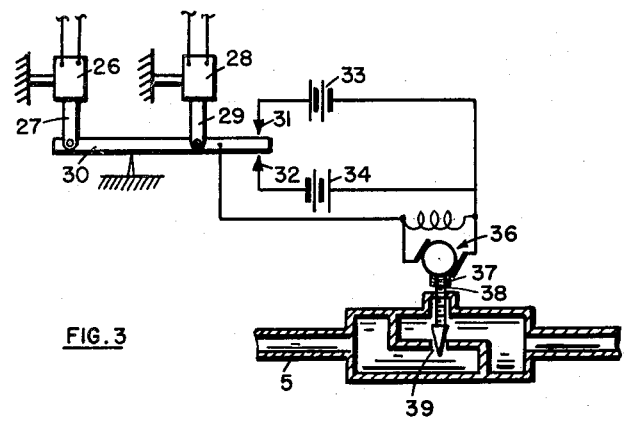
FIG. 3 shows an electromechanical means for positioning the flow regulating valve.

FIG. 3 shows an electromechanical linkage as the positioning means for positioning the setting of the flow regulating valve. An electrical signal is received from potentiometer 13 of FIG. 1 (or an equivalent signal from the autopilot) or from accelerometer 20 of FIG. 2 by solenoid 26. Solenoid 28 receives a signal from potentiometer 14 of FIG. 1 or accelerometer 21 of FIG. 2. Solenoids 26 and 28 each have cores 27 and 29, respectively, mechanically connected to a fulcrum balance arm 30. The balance arm 30 is positioned between two electrical contacts 31 and 32 which have in series therewith power sources 33 and 34, respectively, of opposite polarities. The electromechanical device illustrated is of the null balancing type in that the balance arm seeks a null position when like signals are received in the solenoids 26 and 28. Like signals can only be obtained in the solenoids when the center of gravity is at the desired point. If an unbalance occurs, as sensed by any of the above-described sensing means, the null balance arm 30 will contact one or the other of the contacts 31 or 32 and will drive a reversible motor 36. An output shaft 37 of the motor 36 is threaded internally and receives an externally threaded moveable valve stem 38 connected to valve gate 39. The amount and direction of the rotation of the motor as dictated by the position of the null balance arm and the signals to the solenoids determine the amount and direction of rotation of the valve stem 38 within the internally threaded shaft 37 to control the opening in the conduit 5 leading from one tank to the other. It can be seen that various modifications can be made of the type of valve control and circuitry necessary to perform the desired function.

Figure 4:
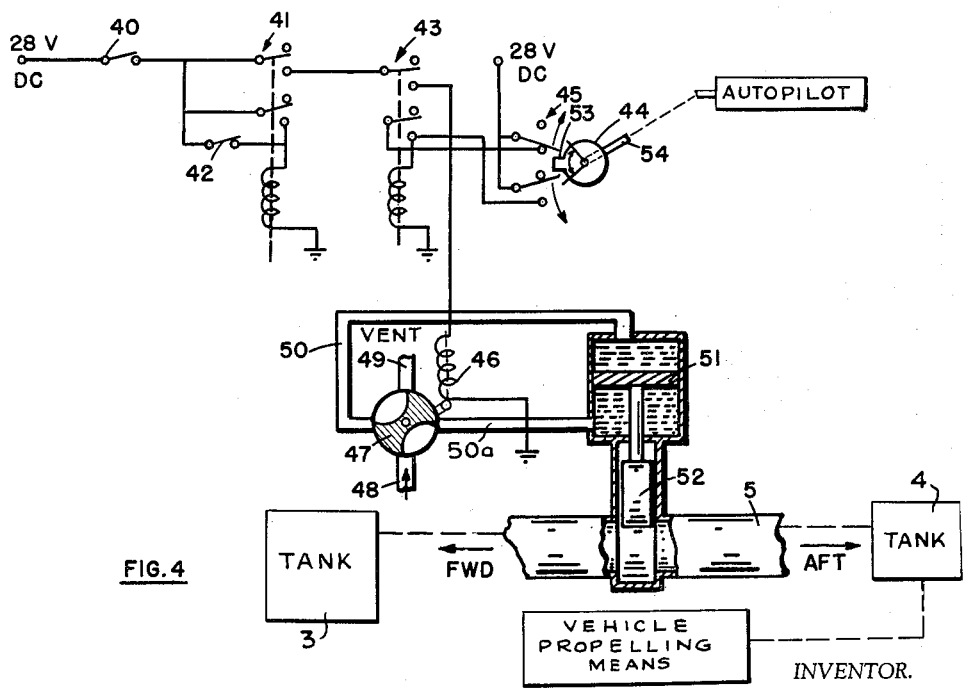
FIG. 4 is a schematic drawing showing an electrohydraulic means of valve actuation and control from an autopilot output.

In FIG. 4 a preferred form of the invention, a complete center of gravity control system for an airframe, is shown. A switch 40 is provided to start flow of fuel to the prime propelling means such as a ramjet engine. A center of gravity control initiating switch 42 is provided to initiate the functioning of the system. This switch 42 may be a liquid level switch which closes when a predetermined level is reached within one or the other of the fuel tanks. The closing of the switch 42 energizes a hold-down type relay 41 which initiates center of gravity control and keeps control even if switch 42 is opened. A second hold-down type relay 43 is provided to operate a solenoid 46 of a four-way solenoid valve 47. Actuation of relay 43 is accomplished by means of a cam switch 45 actuated by an output shaft 54 of the airframe autopilot having a cam projection 53 positioned between switch contacts. At various angular positions of the autopilot output shaft 54 different contact arms of switch 45 are contacted and operated by projection 53. Since relay 43 is of the hold-down type, the relay will not drop out until the other switch contact in switch 15 is actuated by movement of the cam 44 and projection 53. Thus solenoid 46 remains actuated until the atuopilot shaft cam has reached the opposite limit of its travel at which time solenoid 46 will become de-energized thus changing the position of the four-way solenoid valve 47. Hydraulic pressure is applied to solenoid valve 47 through line 48 and is conducted through pressure line 50 to one side of a confined piston 51 when the solenoid valve is in the de-energized position. The valve in FIG. 4 is shown in the energized position which provides for flow from hydraulic source 48 through line 50a to the underside of piston 51 opening the valve gate 52. The liquid above the piston flows out line 50 to vent 49. De-energization drops out the core within the coil of solenoid 46 moving the valve 90° to connect line 48 and line 50 directly. The pressure of the fluid forces piston 51 in a downward direction placing a depending valve gate into a blocking position in the conduit 5 connecting the forward and aft tanks. The center of gravity control valve shown in FIG. 4 is of the on—off type and, as shown, provides for intermittent flow in one direction only. A vent 49 is ordinarily provided in the four-way solenoid valve 47. The system described in FIG. 4 maintains the center of gravity within limits by a two-position control. In effect, when the airframe elevators are deflected up (indicating forward center of gravity), the flow proportioning valve is actuated to a position resulting in rearward center of gravity movement. And conversely, with the elevators down (indicating an aft center of gravity), the valve is actuated to a closed position resulting in a forward center of gravity movement due to the inherent forward movement of the airframe caused by taking fuel from the missile tanks for propulsion purposes. In this embodiment the fuel is not balanced but rather the center of gravity of the airframe is controlled within prescribed limits. The autopilot output shaft movement is a function of elevator movement. A shaft rotation may be provided remotely from the autopilot package by means of an appropriate autopilot signal. This is particularly advantageous when it is desired that the switch means 45 be at a distant location from the autopilot itself. In the system illustrated in FIG. 4 the autopilot cam 44 and the switch 45 are ordinarily contained in the same chamber.

It can be seen that in the various systems described above that various tank combinations may be used to provide fuel for the engines of the vehicle with automatic control over the position of the center of gravity.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An airborne vehicle center of gravity control for heavier-than-air vehicles, comprising a liquid-propellant-containing tank forwardly of the center of gravity of the vehicle, a second liquid-propellant containing tank rearwardly of the center of gravity of the vehicle, at least one of said tanks being operably connected to provide liquid propellant to a vehicle propelling means, conduit means in communication between said tanks to conduct liquid propellant from one tank to the other, a flow regulating valve within said conduit, positioning means for positioning the setting of said valve and means sensing changes in said vehicle center of gravity, said last-mentioned means having an output dependent on said changes to control said positioning means and liquid flow means to transfer liquid propellant from one of said tanks to the other through said valve and conduit means to adjust the center of gravity of said vehicle.

2. The invention as set out in claim 1 in which said positioning means includes a balancing circuit and said means sensing changes has an electrical output.

3. The invention as set out in claim1 in which said positioning means includes a Wheatstone bridge circuit and the means sensing changes is a vehicle horizontal control surface having an electrical output to said circuit.

4. The invention as set out in claim 1 in which said means for sensing comprises accelerometer means positioned forward and aft of a desired center of gravity.

5. The invention as set out in claim 1 in which said means for sensing includes aerodynamic control means.

6. In combination with an airborne vehicle control means for heavier-than-air vehicles, a vehicle center of gravity control, said gravity control comprising fuel tanks forward and aft of a predetermined position of vehicle center of gravity at least one of said tanks operably connected to provide fuel to a vehicle propelling means, conduit means to flow liquid from one tank on one side of said position to another tank on the opposite side of said position, flow regulating valve means in said conduit means for controlling said flow, positioning means for positioning said valve, said airborne vehicle control means having an output dependent on changes in center of gravity, said positioning means being responsive to said output whereby flow of fuel between said tanks returns the center of gravity to the predetermined position.

7. The invention as set out in claim 6 in which said airborne vehicle control means comprises a horizontal vehicle control surface, the movements of said surface being a function of changes in vehicle center of gravity movement.

8. The invention as set out in claim 6 in which said airborne vehicle control means is an output signal from an autopilot proportional to changes in vehicle center of gravity.

9. The invention as set out in claim 8 in which said valve is operated automatically and said positioning means includes a solenoid-operated valve operable by an autopilot shaft-operated relay.

References Cited in the file of this patent

UNITED STATES PATENTS

| | | |
|---|---|---|
| 1,818,104 | Sperry | Aug. 11, 1931 |
| 1,853,376 | Powelson et al. | Apr. 12, 1932 |
| 2,017,072 | Minorsky | Oct. 15, 1935 |
| 2,352,044 | Von Den Steiner | June 20, 1949 |
| 2,584,298 | Seay | Feb. 5, 1952 |
| 2,755,046 | Underwood | July 17, 1956 |